Feb. 3, 1931. C. F. HINDLE 1,791,207
RECORDING CAMERA
Filed May 13, 1924 4 Sheets-Sheet 1

Inventor
CHARLES F. HINDLE
By his Attorney

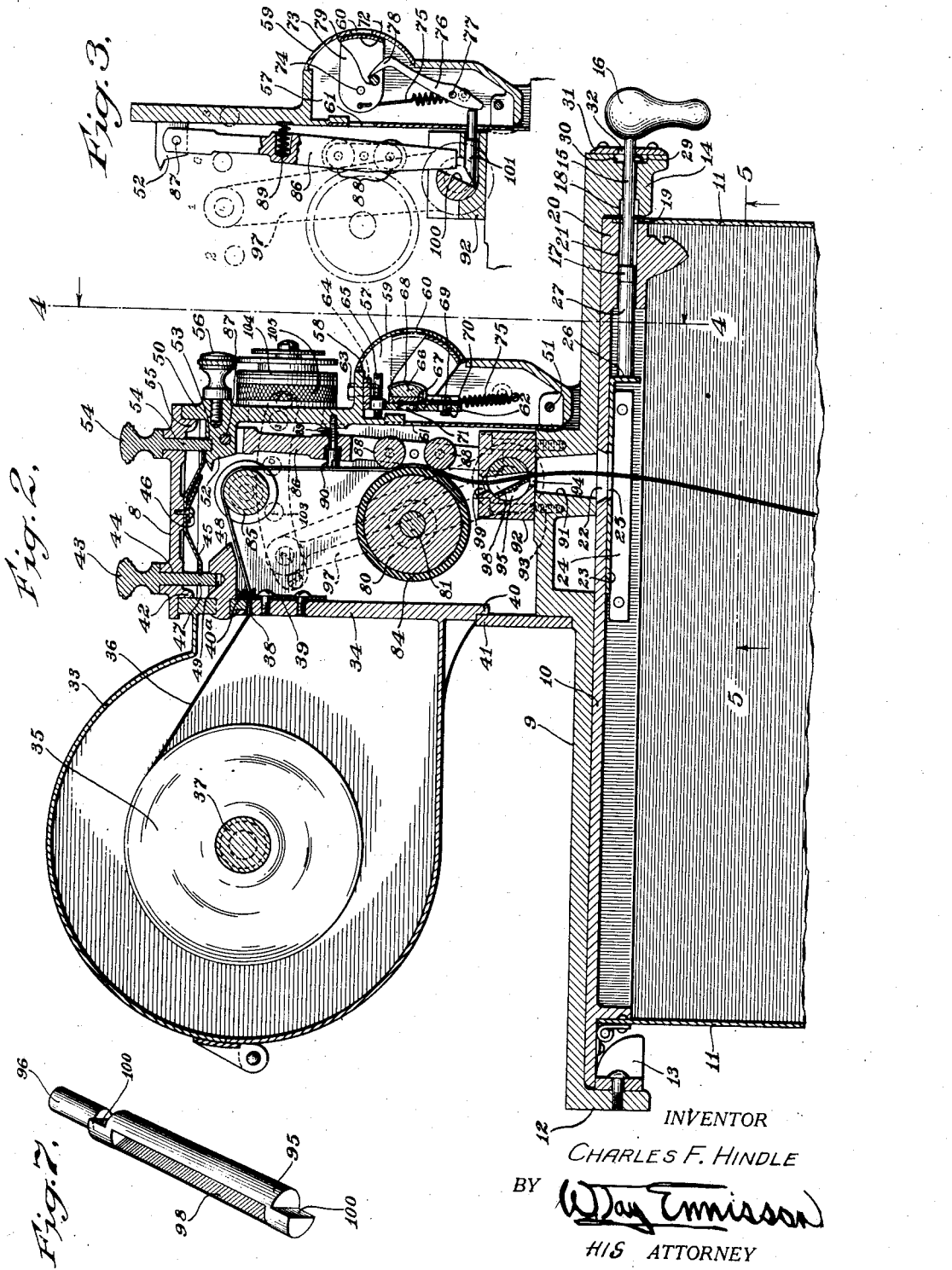

Feb. 3, 1931.  C. F. HINDLE  1,791,207
RECORDING CAMERA
Filed May 13, 1924   4 Sheets-Sheet 3
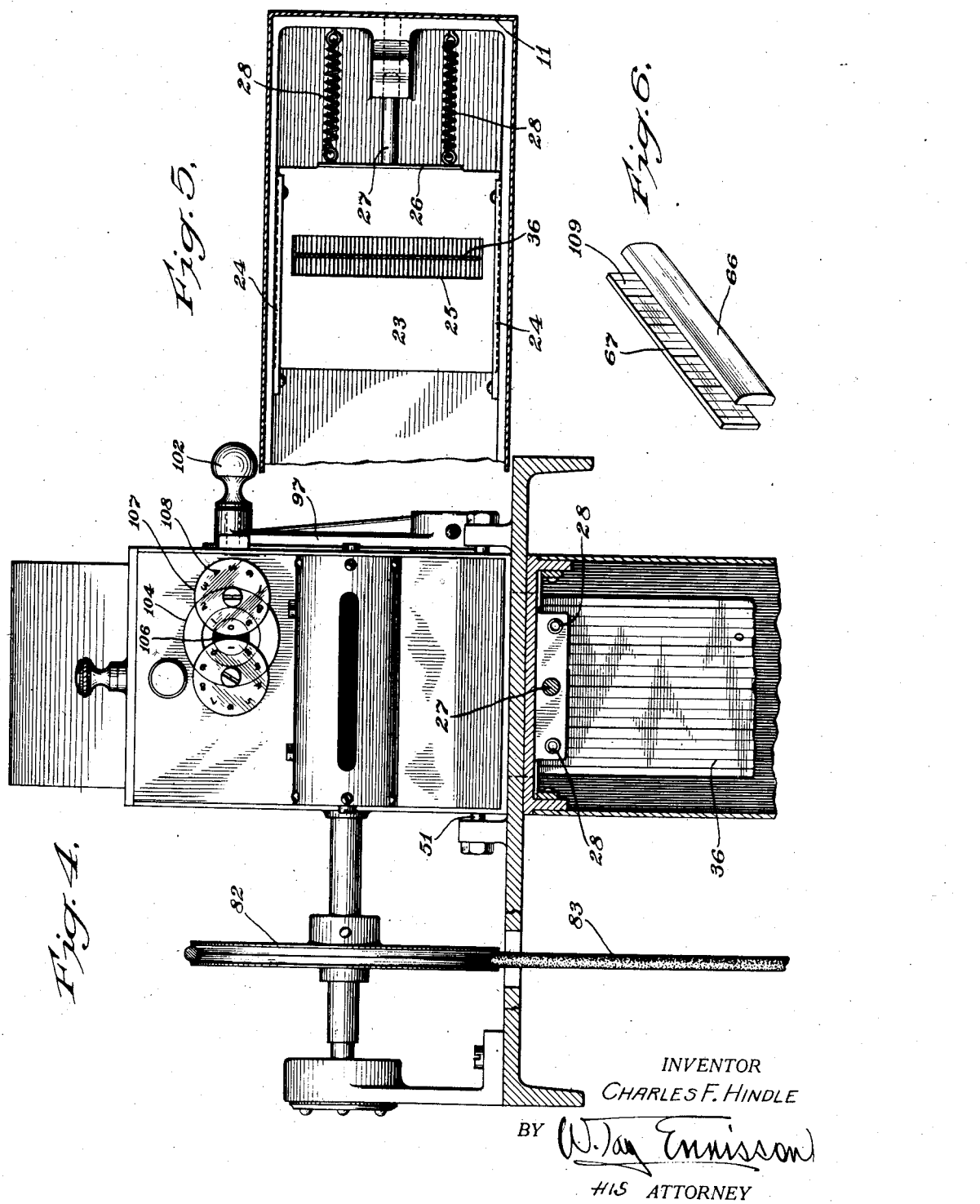
INVENTOR
CHARLES F. HINDLE
BY
HIS ATTORNEY

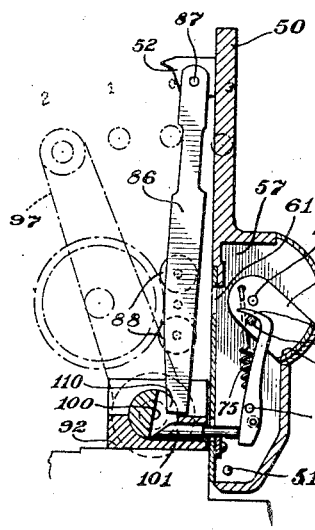
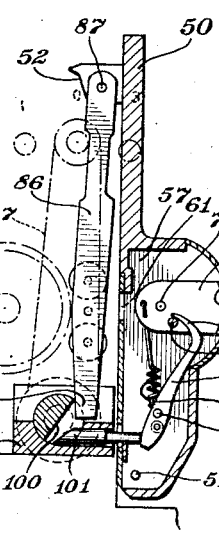
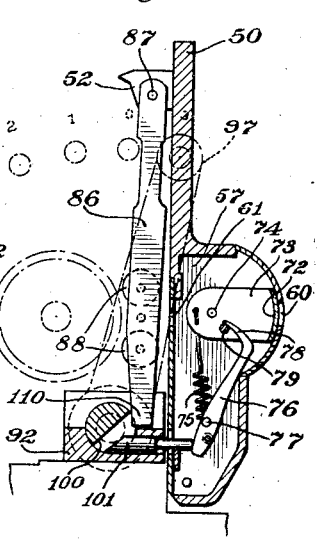
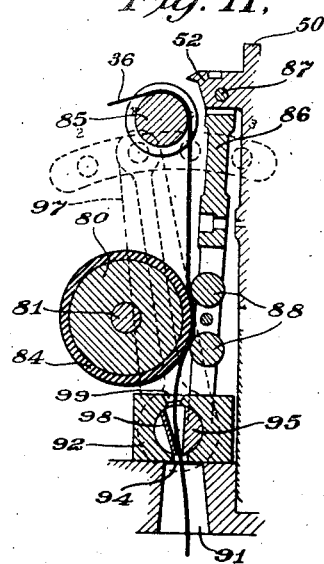
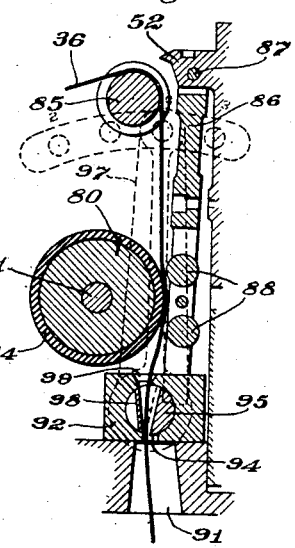
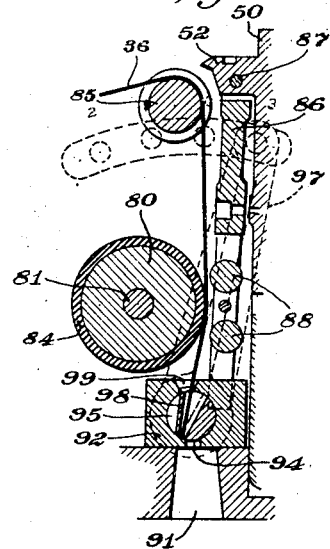

Patented Feb. 3, 1931

1,791,207

UNITED STATES PATENT OFFICE

CHARLES F. HINDLE, OF OSSINING, NEW YORK, ASSIGNOR TO CAMBRIDGE INSTRUMENT COMPANY, INC., OF OSSINING, NEW YORK, A CORPORATION OF NEW YORK

RECORDING CAMERA

Application filed May 13, 1924. Serial No. 712,974.

This invention relates to cameras and particularly to devices for recording the variations in the positions of a member movable in response to an electric current. An object of the invention is to provide an improved camera which may be operated in a light room, with which a strip of photographic film may be passed through successive photographic positions and exposed portions severed and removed in daylight or actinic light without danger to the film and exposures thereon; with which the feeding, severance and exposure of the film may be effected with a minimum of operating and control members; with which the various control and operating parts are so interrelated that their operations are possible only into definite relative positions which will not permit injury to or improper exposure of the film; with which a new charge of film may be quickly, easily and safely attached in daylight or actinic light, and which will be relatively simple in construction and operation, compact, durable, convenient and relatively inexpensive. Various other objects and advantages will be apparent from the following description of an embodiment of the invention, and the novel features will be hereinafter particularly pointed out in connection with the appended claims.

In the accompanying drawing, Figure 1 is a perspective of a galvanometer for measuring delicate electric currents with one embodiment of the improved camera mounted in such a relation thereto that the successive variations of the movable member of the galvanometer will be photographically recorded in successive positions upon the film of the camera.

Fig. 2 is a longitudinal sectional elevation of the camera.

Fig. 3 is a sectional elevation of a portion of the mechanism shown in Fig. 2 with the parts in slightly different relative positions.

Fig. 4 is a sectional elevation through the camera taken substantially along the line 4—4 of Fig. 2.

Fig. 5 is a bottom sectional plan of a portion of the camera, the section being taken substantially along the line 5—5 of Fig. 2.

Fig. 6 is a perspective of two transparent elements which are disposed between the shutter opening and the film.

Fig. 7 is a perspective of the cut-off and control member removed from the camera.

Fig. 8 is a sectional elevation similar to Fig. 3 with the parts in slightly different relative positions, this position being that occupied by the parts when the shutter is open and the film is being fed.

Fig. 9 is a similar view of the parts in still different relative positions, the condition of the parts being that while the film is not being fed and while the shutter is closed.

Fig. 10 is a similar view of the parts in still another relation, this relation being that existing during the severing of a portion of the film which has been exposed.

Fig. 11 is a view similar to Fig. 3, but with a section taken on a parallel plane thereto to show other details when the parts are in the same relative position as in Fig. 3.

Fig. 12 is a view similar to Fig. 9, but taken upon a parallel plane with the parts in the same relative positions to show other details, and Fig. 13 is a view similar to Fig. 10 showing the action of the cut-off when the parts are in the relative positions shown in Fig. 10.

Figure 1:
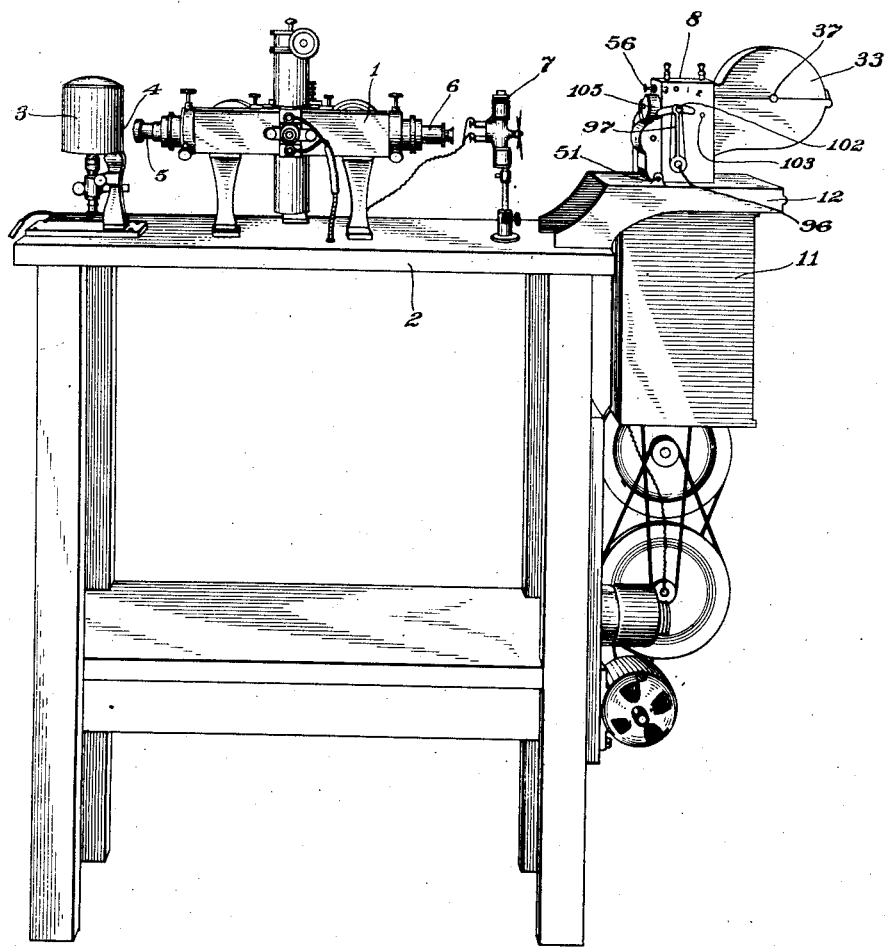

In the illustrated embodiment of the invention and referring particularly to Fig. 1, a galvanometer 1 is mounted upon a suitable support 2 and at one end of the galvonometer a suitable source of light 3 is provided. The light rays from the source of light emerge from the casing surrounding the light through an aperture 4 which is aligned with an optical system 5 forming a part of the galvanometer, the light rays passing through the optical system 5, illuminating the movable member of the galvanometer, and the image or shadow of the movable member is projected through an optical system 6 toward the improved camera designated by the reference numeral 8 in Fig. 1. A suitable time marker 7 may be interposed between the galvanometer and the camera for a purpose which will be hereinafter explained. The galvanometer may be of any suitable kind, and per se forms no part of the present invention, being illustrated merely to show its relation and use with the camera 8, which forms the subject matter of this invention.

Referring particularly to Figs. 2 and 4, a tubular frame 8 open on two opposite faces surmounts a base plate 9 which is adapted to surmount an upper wall 10 of a suitable film receptacle 11, the base plate being provided along one edge with a flange 12 carrying one or more inwardly projecting lugs 13 which are adapted to engage beneath a projecting edge of the upper wall or plate 10 of the receptacle, the upper edge of each lug 13 being arcuate so that the base plate may be rocked through a small angle about an axis substantially at the flange 12. The base plate 9 is provided with a flange 14 along an edge opposite the flange 12 which fits down over one of the lateral walls of the receptacle 11.

A rod 15 is slidably mounted in the flange 14 in a direction normal to the lateral wall of the receptacle which it overhangs and at its outer end carries an operating handle 16. The inner end of the rod 15 is provided with an enlarged head 17 which when the rod is drawn outwardly may enter a recess 18 in the inner face of the flange 14. The abutting lateral wall of the receptacle 11 is provided with an aperture 19 aligned with the recess 18 so as to permit passage of the head 17 therethrough, and a depending flange 20 on the inner face of the cover 10 of the receptacle is provided with a passage 21 also aligned with the aperture 19 and the recess 18, so that when the rod 15 is thrust inwardly the head 17 will pass through the lateral wall of the receptacle and into the depending flange 20 on the cover 10 of the receptacle.

Referring particularly to Figs. 2, 4 and 5, the cover 10 is provided with a slot 22 for the passage of a strip of film, as will be hereinafter explained, and a closure plate 23 is slidably confined by side bars 24 on the cover against the underface of the cover. The closure plate 23 is provided with a slot or aperture 25 which in one position of the plate may be in alignment with the aperture 22 of the cover. When the closure plate is given a sliding movement along the underface of the cover, the slot 25 will move out of alignment with the slot 22 of the cover and prevent communication with the interior of the receptacle through the slot 22 of the cover. The closure plate at its forward end is provided with a flange 26 carrying a rod 27 which reciprocates in the passage 21 in the depending flange 20 of the cover. When the rod 15 is thrust inwardly it will engage with the rod 27 and through it shift the closure plate in a direction to carry the slots 22 and 25 into alignment and when the rod 15 is pulled outwardly the closure plate 23 will be released. One or more springs 28 (see Figs. 4 and 5) may be connected between the flange 26 and the depending flange 20 so as to shift the closure plate 23 in a direction to close the aperture 22. In order to hold the closure plate with its slot 25 in alignment with the slot 22, the rod 15 may be provided with a pin 29 which is adapted to enter a recess 30 in the outer edge face of the base plate and lock behind a cover plate 31 over the recess, the rod when locked in this position being at its inner position in which it holds the closure plate 23 in the position shown. The cover plate 31 may have a slot 32 therein through which the pin 29 may be passed in entering the recess 30, the rod 15 being rotated after the pin 29 enters the recess in order to lock the pin 29 behind the cover plate. The rod 15 is released by first rotating it to bring the pin 29 into alignment with the passage 32, whereupon it may be drawn outwardly with the pin 29 passing through the aperture or passage 32. The springs 28 automatically shift the closure plate 23 into a position to close the aperture or slot 22.

A film box 33 is provided upon the outer face of a removable wall 34 for one end of the frame 8 so as to close the frame upon that face. In the box a reel 35 carrying a long strip of film 36 is rotatably mounted upon a suitable bearing shaft 37 and the outer end of the film strip passes through an aperture or slot 38 in the wall 34. The inner face of the wall 34, that is, the face within the frame 8, is provided above and below the slot 38 with suitable flexible strips 39 and 40$^a$ which normally close the slot 38 but flex away therefrom slightly when the film is inserted through the slot. The strips 39 in flexing press lightly upon the film so as to prevent the passage of light through the aperture 38. The lower end edge of the wall 34 is provided with a hooked portion 40 which is adapted to interlock behind the short upright wall section 41 and the upper end of the wall 34 is adapted to abut against a rib 42 depending from the upper wall surface of the frame 8. A locking pin 43 is mounted for reciprocation through an aperture 44 in the upper wall of the frame 8 and is yieldingly stressed into its lower or inner position by a leaf spring 45 which is secured in any suitable manner, such as by a screw 46, to the under face of the top wall of the frame with a slotted end engaging in an annular groove 47 in the inner end of the pin 43. A lug 48 is carried by the wall 34 so as to project therefrom into the interior of the frame 8 and into the path of the pin 43 when the latter is at its extreme inner position as urged by the leaf spring 45. The lug 48 is provided with a notch 49 into which the inner end of the pin 43 may engage and thus latch the wall 34 to the frame 8. To remove the wall 34 it is merely necessary to pull upwardly upon the pin 43 which releases the lug 48, whereupon the wall 34 may be tipped outwardly at its upper end until it clears the upper wall of the frame 8. The wall 34 and the film box carried thereby may then be removed by a disengagement of the hooked end 40 from the stub wall 41.

A wall 50 is hinged by a pin 51 to the base plate 9 so as to swing into a position in which it closes the open face of the frame 8 upon the opposite side from the film box. This wall 50 therefore closes the casing formed by the frame 8, base plate 9, the film box and this wall. The inner face of the wall 50 is provided with a lug 52 having a notch 53 in its upper face into which the lower end of a pin 54 similar to the pin 43 may enter. The leaf spring 45 extends beyond the securing screw 46 and embraces an annular groove in the inner end of the pin 54 for normally projecting it inwardly so that the pin will snap into the recess 53 automatically when the wall 50 is swung into closed position. Both the lugs 48 and 52 may have bevelled noses upon their extreme inner ends for camming the pins 43 and 54 upwardly when the walls are moved into closed position. The frame 8 may have a depending rib 55 upon the inner face of its upper wall to serve as a stop for the wall 50. A button 56 may be secured to the outer face of the wall 50 to enable the wall to be swung into either open or closed position.

The wall 50 is provided at its lower end with a lens and shutter chamber 57 having a window 58 which is normally closed by an arcuate plate 59. The plate 59 and the inner wall of the chamber 57 are provided with apertures 60 and 61 respectively, which are aligned so that light rays entering the aperture 60 may pass through the lens chamber and through the aperture 61 into the interior of the casing. An L-shaped frame 62 is secured by one leg to the under face of the upper wall of the chamber 57 so as to depend into the interior of the chamber, the frame 62 being secured to said upper wall by a bolt 63 which passes through the upper wall and through the slots 64 in the frame 62 so that when the bolt 63 is loosened the frame 62 may be adjusted in a direction between the front and rear walls of the chamber. When the bolt 63 is tightened the frame will be securely clamped in adjusted positions. If desired a set screw or limit screw 65 may be threaded through the depending leg of the frame 62 so as to abut against the rear wall of the chamber 57, and serve as a guide for adjustably limiting the rearward movement of the depending frame and when operated to force the frame upwardly by its reaction upon the inner wall of the chamber.

A lens 66 and a transparent plate 67 may be mounted face to face against the outer face of the frame 62 in any suitable manner such as by brackets 68, and the brackets are adjustably secured to the depending arm of the frame 62 in any suitable manner, such as by bolts 69, which pass through the brackets 68 and through a slot 70 extending vertically in the frame 62. By loosening the bolts 69 the brackets 68 and the lens and plate carried thereby may be shifted vertically for assisting in the focussing of light rays, as will be explained hereinafter. The lens 66 and its accompanying plate 67 are located between the apertures 60 and 61 so that light rays passing through the said apertures will pass through the lens and the transparent plate. The frame 62 is provided with an aperture 71 aligned with the apertures 60 and 61 so that the light rays passing through the lenses will be able to pass through the frame as well.

A shutter 72 is pivoted at its ends 73 upon pivot pins 74 provided upon the end walls of the chamber 57 so as to be movable from the position shown in Fig. 2 in which it uncovers the aperture 60 to a position such as shown in Fig. 3 in which it closes the aperture 60. A spring 75 connected between one or both of the arms 73 and a suitable anchorage upon one of the walls of the chamber 57 serves yieldingly to urge the shutter into aperture closing position. A lever 76 is pivoted at 77 within the chamber 57 and at its upper end is provided with a hook portion 78 which is adapted to overlie a pin 79 provided upon one of the end arms 73 of the shutter so as to limit the upward movement of the shutter under the action of the springs 75. The nose or portion 78 acts as a cam upon the pin 79 so that when the lever 76 is operated in one direction about its pivot it will cam the pin 79 downwardly and force the shutter into open position as shown in Figures 2 and 8. When the lever is released the spring 75 will shift the shutter to closed position and the pin 79 will cam the lever 78 toward the outer wall of the chamber and when the lever engages said outer wall it will be held in that position and serve as a limit stop for the shutter. This position of the shutter and lever is shown in Fig. 3. The levers 76 may be provided at both ends of the chamber 57.

Within the casing formed by the frame 8 a feeding drum 80 is rotatably mounted upon a shaft 81 which has bearing in and extends through one of the lateral walls of the frame 8, the outer end carrying the pulley 82 by which it may be driven through a belt 83 by any suitable source of power, such as a motor.

The periphery of the drum is provided with a frictional coating 84 so that any object passing in contact with the drum will be fed along by the drum. The strip of film 36 after entering the chamber formed within the frame 8 passes over a suitable guide roller 85 at the upper end of the casing and then downwardly in proximity to the drum periphery and between the drum and the aperture 61.

A frame 86 is hinged at 87 to the lug 52 projecting inwardly from the inner face of the wall 50 and depends downward therefrom so as to swing toward and from the periphery of the drum. The frame is provided with a pair of rollers 88 which are rotatably mounted in spaced relation thereon. The rollers are adapted to press the film strip 36 against the periphery of the drum so that the rotation of the drum will propel the strip. The rollers 88 are spaced apart and arranged upon the frame 86 so as to provide a space between them which is aligned with the aperture 61. The light rays passing through the aperture 61 may therefore fall upon the portion of the film strip which is in contact with the drum between the two rollers 88. A spring 89 is compressed between the frame 86 and the inner face of the wall 50 so as normally and yieldingly to urge the frame 86 toward the drum and yieldingly press the rollers 88 in contact with the film or drum. A screw 90 passing through an aperture in the frame 86 and threaded into the wall 50 serves as a limit stop for the frame 86, so that when the wall 50 is swung forwardly the movement of the frame 86 by the spring 89 will be restricted.

The base plate 9 is provided with an aperture 91 which is aligned with the aperture 22 of the cover of the receptacle 11 when the base plate 9 is secured thereto. A bearing block 92 is secured in any suitable manner such as by screws 93 to the base plate 9 within the frame 8 and is provided with an aperture 94 which opens into the aperture 91. A cylindrical cut off element 95 is rotatably mounted in a cylindrical bearing in the block 92 and has an end 96 extending from one lateral face of the frame 8 for the attachment of a suitable operating handle or arm 97. The cut-off element 95 is provided with a slot 98 extending lengthwise thereof, the slot being wider at one side than at the other. When the cut-off element is rotated in its bearing block the slot 98 will be brought into and out of alignment with the aperture 94 in the block. The bearing block is also provided in its upper face with a slot 99 which is substantially aligned with the passage or aperture 94 in the bottom wall of the bearing block.

The film strip 36 passes from the drum downwardly through the slot 99, through the slot 98 in the cut-off element, through the passages or apertures 94, 91, 22 and 25 into the receptacle 11. When the cut-off element is rotated by a manipulation of the handle 97 the lower edge of its slot will force the film strip against an edge of the aperture 94 and shear the film at this edge, the severed portion falling into the box 11.

The cut-off element at points adjacent the ends of the slot 98 is provided with cut-off portions 100 (see Figures 3 and 7 to 10 inclusive) which are adapted to act as cams in a manner presently to be explained. A pair of pins 101 (see Figs. 3 and 8 to 10) are mounted for reciprocation laterally of the cut-off element in the bearing blocks 92 and these pins project into the path of the lower ends of the levers 76 so that when the cut-off element is rotated in one direction it will force the pins 101 away therefrom and cause operations of the lever 76 to depress or open the shutter 72. When the cut-off element is rotated in the reverse direction the pins 101 will be released and the spring 75 acting upon the shutter will through the pins 79 cam the levers 76 in a direction to force the pins 101 to follow the cam surfaces 100.

The lever or arm 97 at its free end is provided with a pin 102 which is spring pressed against the lateral wall of the frame 8 so as to enter depressions 103 arranged in a successive manner upon the frame 8. The pin 102 in entering one of the depressions 103 will lock the arm in that particular position.

The wall 50 is provided with a small casing 104 upon its outer face which carries a suitable shutter mechanism operable by a peripheral section 105 (see Fig. 2) and the wall 50 is also provided with an aperture entering the casing, which aperture is controlled by the shutter. The outer face of the casing is also provided with an aperture 106 (see Fig. 4) so that when the shutter is open light rays will enter the interior of the casing formed by the frame 8. The casing 104 is so disposed that the light rays entering through it will fall upon a portion of the film between the roller 85 and the drum. A plurality of discs 107 are rotatably mounted upon the outer face of the casing 104 with their edges overlying the aperture 106. These discs are preferably transparent and carry suitable opaque indicia 108 so that the light rays entering the aperture 106 will project shadow images of the indicia upon the opening over the film. This serves to print a selective identifying number upon each strip of film, it being understood that the shutter operated by the member 105 will be kept closed except at the start or finish of the exposure of a particular strip of film.

The transparent plate 67 which lies immediately beyond the lens 66 is preferably provided with vertical lines 109 (see Fig. 6) running vertically so that these lines will be photographed upon the strip of film which moves over the drum.

The frame 86 has depending ends 110 which lie within the control of the cam surfaces 100 so that when the cut-off element is rotated in a direction to sever a strip of film the cam surfaces 100 will force the frame 86 away from the drum and release the film therefrom. This will cause a cessation of the feeding of the film during a cut-off operation.

In the operation of the device the pin 43 is pulled upwardly to release the film box, which is then removed and taken to a dark room, and a new roll of unexposed film is inserted with the outer end of the film passing slightly through the slot 38. The film box is then re-applied to the frame 8 so as to complete the casing formed upon the frame 8 and thereupon the wall 50 may be released by pulling outwardly upon the pin 54 so that it can be swung downwardly. This permits access to the interior of the casing so that one can pull the film through the slit 38 and guide it over the roller 85 and downwardly between the drum 80 and the rollers 88 and through the cut-off element. The wall 50 may then be moved to closed position where it will be latched automatically by the spring pressed pin 54. The frame 86 will be yieldingly urged toward the drum so as to press the film tightly against the periphery of the drum. The drum is continuously rotated by its driving motor and when the film is pressed in contact therewith it will be driven therefrom through the casing. Feeding the film, however, will not be effective when the cut off element is rotated to force the frame 86 away from the drum. At either the beginning or end of a photographic operation an exposure is made through the casing 104 to photograph upon the film an identifying indicia or symbol and then the shutter controlling it is closed.

The camera is disposed in such a position that the light rays forming the image to be photographed will enter the aperture 60. The normal position of the arm 97 is in the zero position (see Fig. 1) which position is the second from the front. In this position of the arm which is shown in Figs. 9 and 12 the cut-off element will not be effective to sever the film and the frame 86 will be cammed away from the drum. The drum may therefore rotate without feeding the film. In the same position the shutter 72 will be closed.

To start the photographic operation the lever or arm 97 is moved rearwardly through one position, which is the No. 1 position shown in Fig. 1. This position of the parts is shown in Figs. 3 and 11. In this position of the controlling arm 97 the frame 86 controlling the feeding of the film will be released so as to cause a feeding of the film, but the shutter will still be closed. The cut-off element is of course ineffective and permits a free feeding of the film therethrough. By a further movement of the controlling arm 97 into its extreme rearward position, which is No. 2 position in Fig. 1, the parts will be in the position shown in Figs. 2 and 8. In this position the shutter will be forced open so as to permit of the exposure of the film passing the drum periphery, and the feeding of the film will continue. After the desired exposure has been made, the controlling arm 97 may be swung backwardly to the zero position, which will close the shutter and stop the feeding operation.

To sever the exposed piece of film from the unexposed roll it is merely necessary to shift the controlling arm 97 forwardly to the No. 3 position, which is the foremost position, during which the shutter will remain closed, the frame 86 will remain away from the drum and the slot 98 will move out of alignment with the passage 94 in the bearing block so as to cut off the strip of film which has passed through the casing and into the receptacle. (See Figs. 10 and 13).

With the parts in this position the cut-off element will close the aperture 94 and prevent the entrance of light into the interior of the casing.

To remove the exposed and severed strip of film the handle 16 is operated to release the base plate 9 from the receptacle, which causes an automatic closing of the aperture 22 of the cover of the receptacle. The receptacle may then be taken to a dark room and the exposed film removed and developed. The lines which are photographed upon the film by reason of the lines 109 of the plate 67 are shown in full lines upon the film strip in Fig. 4, but it will be understood that this represents merely the appearance of the film after development. During the photographic operation the marker 7 is disposed so that its vanes or arms will be disposed successively across the light rays entering the camera for a short instant so as to photograph successive positions of these arms. The marker 7 is driven synchronously from a suitable time controlled device so that these horizontal lines so photographed upon the film will indicate intervals of time upon the film, which may be useful in the interpretation of the photographic film thus prepared.

It will be understood that various changes in the details which have been herein described and illustrated for the purpose of explaining the nature of the invention may be made by those skilled in the art, within the principle and scope of the invention as expressed in the appended claims.

I claim:

1. In a camera, a casing having a shutter opening and a shutter for the opening, means for feeding a photographic film past said opening, a cut-off element rotatably mounted in the casing in a position to sever the film at a point after it has passed the said opening, and means for controlling the shutter comprising a cam lever controlled by rotatable action of the cut off element, whereby the shutter opening will be closed automatically when the film is severed.

2. In a camera, a casing having a shutter opening and a shutter for the opening, a constantly rotating drum over which a photographic film passes for exposure through the shutter opening, means comprising a swing arm movable toward the drum for pressing the film against the latter to cause a forward feeding of the film, a cut off element rotatably mounted in the casing in a position when operated to sever the film at a point after it has passed said opening, said rotatable element having an impinging surface adapted to engage said arm to actuate the same so that the feeding of the film will be prevented while the film is being severed, and controlling means for the shutter comprising a cam lever controlled by rotatable action of the cut off element whereby the shutter opening will be closed when the film is severed.

3. In a camera, a casing having an exposure opening, means for passing a photographic film through the casing for exposure through said opening, a rotary cut-off element, a bearing for said element, said element and bearing having apertures for the passage of the film which may be brought into or out of alignment by the rotation of said element, the film being severed by rotation of the element to carry its aperture out of alignment with the aperture of the bearing, a cam portion on said element, a shutter for said opening, and means controlled by the cam and in turn controlling the shutter for insuring a closure of the exposure opening by the shutter when the said element is rotated to sever the film.

4. In a camera, a casing having an exposure opening, means for passing a photographic film through the casing for exposure through said opening, a rotary cut-off element, a bearing for said element, said element and bearing having apertures for the passage of the film which may be brought into or out of alignment by the rotation of said element, the film being severed by rotation of the element to carry its aperture out of alignment with the aperture of the bearing, a cam portion on said element, a shutter for said opening, and means controlled by the cam and in turn controlling the shutter for insuring a closure of the exposure opening by the shutter when the said element is rotated to sever the film, a feeding drum in the casing over which the film passes, spring yielding means for pressing the film against the drum to effect a driving of the film, said pressing means comprising a swing lever actuated by the cut-off element during the rotation thereof whereby the film will be released from the drum to stop the feeding thereof as the cut-off element moves to sever the film.

5. In a camera, a casing having an exposure aperture in one wall, a feeding drum rotatably mounted in the casing and aligned with the said aperture, means for guiding a film to and over the drum upon the side toward said aperture, a frame movable toward and from aperture, a frame movable toward and from said drum and carrying rollers pressing the film against the drum to cause the film to be fed past the aperture by the drum, and means for yieldingly urging the frame toward the drum to carry the rollers against the film and drum, said rollers being spaced to expose to the aperture a portion of the film held against the drum.

6. In a camera, a casing having an exposure aperture in one wall, a feeding drum rotatably mounted in the casing and aligned with the said aperture, means for guiding a film to and over the drum upon the side toward said aperture, a frame movable toward and from said drum and carrying means pressing the film against the drum to cause the film to be fed past the aperture by the drum, and means for yieldingly urging the frame toward the drum to hold the film against the drum.

7. In a camera, a casing having an exposure aperture in one wall, a feeding drum rotatably mounted in the casing and aligned with the said aperture, means for guiding a film to and over the drum upon the side toward said aperture, a frame movable toward and from said drum and carrying means pressing the film against the drum to cause the film to be fed past the aperture by the drum, means for yieldingly urging the frame toward the drum to hold the film against the drum, means comprising a cylindrical element for severing the film after any desired length has been fed over the drum, and means operable concomitantly with and actuated by the severing means and engageable by an impinging face upon said cylindrical element for shifting the frame away from the drum to release the film and stop the feeding thereof during the severing operation.

8. In a camera, a casing having an exposure opening, a film feeding drum in said casing opposite said opening, means for conducting a sensitized photographic film over the peripheral portion of said drum toward the opening to permit of the placing of a photographic record upon the film, a frame movable toward and from the drum and carrying rollers pressing the film against the drum upon opposite sides of the line of light projection from the exposure opening to said film, and means for yieldingly pressing the frame toward the drum to cause a feeding of the film past said opening by a rotation of said drum.

9. In a camera, a casing having an exposure opening, a film feeding drum in said casing opposite said opening, means for conducting a sensitized photographic film over the peripheral portion of said drum toward the opening to permit of the placing of a photographic record upon the film, a frame movable toward and from the drum and carrying rollers pressing the film against the drum upon opposite sides of the line of light projection from the exposure opening to said film, means for yieldingly pressing the frame toward the drum to cause a feeding of the film past said opening by a rotation of said drum, and means for forcing the frame and rollers away from the drum slightly to release the film and stop the feeding of the same.

10. In a camera, a casing having an exposure opening, a film feeding drum in said casing opposite said opening, means for conducting a sensitized photographic film over the peripheral portion of said drum toward the opening to permit of the placing of a photographic record upon the film, a frame having integral therewith an arm, said frame movable toward and from the drum and carrying rollers pressing the film against the drum upon opposite sides of the line of light projection from the exposure opening to said film, means for yieldingly pressing the frame toward the drum to cause a feeding of the film past said opening by a rotation of said drum, and a cut off device in said casing for severing the film after any desired portion has passed the opening and operable by means of an impinging face to engage said arm to shift said frame to release the film from the drum and stop the feeding during the cut off operation.

11. In a camera, a casing having an exposure opening, two cooperating means for feeding sensitized material in the casing in the path of light rays entering the casing through the exposure opening, means for relatively actuating the two cooperating means into cooperative relation to feed the material, and means operable to shut off the rays of light to the sensitized material and relatively actuate the two cooperating means out of cooperative relation to stop the feeding of the material.

12. In a camera, a casing having an exposure opening through which sensitized material may be exposed, a shutter for closing the opening, means for severing the material, means for actuating the severing means, and means for opening the shutter to expose the material and for closing the shutter upon the actuation of the severing means.

13. In a camera, a casing having an exposure opening, a shutter for closing the opening, means for feeding sensitized material in the casing past the opening, means for maintaining the shutter open during the feeding of the material, means for severing the material, and means for rendering the feeding means ineffective and closing the shutter during the severing operation.

14. In a camera, a casing having an exposure opening, a shutter for normally closing the opening, normally ineffective means for feeding sensitized material in the casing past the opening, normally ineffective means for severing the material, and means operable to one position for opening the shutter and rendering the feeding means effective, and operable to a second position to close the shutter, render the feeding means ineffective and render the severing means effective.

15. In a camera, a casing provided with an exposure opening, a feeding drum having a portion disposed opposite to the exposure opening in the casing for feeding sensitized material in the casing past the exposure opening in order that the portion of the sensitized material passing over the said portion of the drum may be exposed through the exposure opening, means movable toward the drum to press the sensitized material against the drum to render the drum effective to feed the material, means for severing the exposed sensitized material, and means for moving the movable means away from the drum to release the sensitized material and stop the feeding thereof during the severing operation.

16. In a camera, a casing having an exposure opening, a shutter for closing the opening, power-operated means continuously driven to feed sensitized material in the casing past the opening, and manual means operable to simultaneously render the power-operated means ineffective and close the opening.

17. In a camera, a casing provided with a wall opening, a wall for closing the wall opening having a lug, a locking pin extending through a second wall of the casing and cooperating with the lug to lock the first-named wall in position so as to close the opening, a drum in the casing, and means carried by the lug and cooperating with the drum to feed sensitized material in the casing.

18. In a camera, a casing provided with a wall opening, a wall for closing the wall opening, a feeding drum in the casing, and a feeding roll carried by the wall and cooperating with the drum to feed sensitized material in the casing.

19. In a camera, a casing provided with a wall opening, a box adapted to contain sensitized material, means for mounting the box on the casing so as to close the wall opening, the casing having a second wall opening through which the sensitized material in the box is accessible in the casing, a feeding drum in the casing, and a wall for closing the second wall opening and having means cooperating with the drum to feed sensitized material in the casing.

20. In a camera, a casing provided with an exposure opening, a cylindrical lens through which light rays are adapted to enter the casing through the exposure opening, a graduated transparent plate in the path of the light rays, the graduations of the plate extending at right angles to the axis of the cylindrical lens, and means for feeding sensitized material through the casing in the path of the light rays.

21. In a camera, a casing having an exposure opening, a cylindrical lens through which light rays are adapted to enter the casing through the exposure opening, two cooperating means for feeding sensitized material in the casing in the path of the light rays, means for relatively actuating the two cooperating means into cooperative relation to feed the material, and means operable to shut off the rays of light to the sensitized material and relatively actuate the two cooperating means out of cooperative relation to stop the feeding of the material.

22. In a camera, a casing having an exposure opening, a shutter for closing the opening, two cooperating means for feeding sensitized material in the casing past the opening, means for relatively actuating the two cooperating means into cooperative relation to feed the material, and means operable to close the shutter and relatively actuate the two cooperating means out of cooperative relation to stop the feeding of the material.

23. In a camera, a casing having an exposure opening, a shutter for closing the opening, two cooperating means for feeding sensitized material in the casing past the opening, and means operable to one position to open the shutter and relatively actuate the two cooperating means into cooperative relation to render the feeding means effective, and operable to a second position to close the shutter, and relatively actuate the two cooperating means out of cooperative relation to render the feeding means ineffective.

24. In a camera, a casing provided with an exposure opening and a wall opening and having a removable wall for closing the wall opening, a box provided upon the outer face of the removable wall and adapted to contain sensitized material, the wall having an aperture through which the sensitized material is adapted to project, the removable wall having a portion adapted to hook against a part of the boundary of the wall opening, whereby the box may be mounted on the casing so that the removable wall shall close the wall opening, means for removably locking the box to the casing, and means for feeding the sensitized material from the box through the aperture and into the casing past the exposure opening.

25. In a camera, a casing provided with an exposure opening and a wall opening and having a removable wall for closing the wall opening, a box provided upon the outer face of the removable wall and adapted to contain sensitized material, the box having a body portion and a cover portion, an aperture being formed at the junction between the body portion and the cover portion, through which the sensitized material in the box is adapted to project, means for mounting the box on the casing so that the removable wall shall close the wall opening, and means for feeding the sensitized material from the box through the aperture and into the casing past the exposure opening.

26. In a camera, a casing provided with an exposure opening, means disposed opposite to the exposure opening in the casing for feeding sensitized material in the casing past the exposure opening in order that the portion of the sensitized material passing over the said oppositely disposed means may be exposed through the exposure opening, and means movable toward and from the oppositely disposed means to cooperate with the oppositely disposed means to feed the material.

27. In a camera, a casing provided with an exposure opening, means disposed opposite to the exposure opening in the casing for feeding sensitized material in the casing past the exposure opening in order that the portion of the sensitized material passing over the said oppositely disposed means may be exposed through the exposure opening, means movable toward the oppositely disposed means to cooperate with the oppositely disposed means to feed the material, means for severing the sensitized material, and means for rendering the feeding means ineffective during the severing operation.

28. In a camera, a casing provided with an exposure opening, means disposed opposite to the exposure opening in the casing for feeding sensitized material in the casing past the exposure opening in order that the portion of the sensitized material passing over the said oppositely disposed means may be exposed through the exposure opening, means for severing the sensitized material, and means for rendering the feeding means ineffective during the severing operation.

29. In a camera, a casing provided with an exposure opening, a feeding drum having a portion disposed opposite to the exposure opening in the casing for feeding sensitized material in the casing past the exposure opening in order that the portion of the sensitized material passing over the said portion of the drum may be exposed through the exposure opening, two rollers movable toward the drum on opposite sides of the exposure opening to press the sensitized material against the drum on opposite sides of the exposure opening to render the drum effective to feed the material and means for moving the rollers away from the drum to free the sensitized material and render the drum ineffective to feed the material.

30. In a camera, a casing provided with a wall opening, a wall for closing the wall opening, the casing having a second wall opening, a feeding drum in the casing, and a wall for closing the second wall opening and having means cooperating with the drum to feed sensitized material in the casing.

In testimony whereof I have hereunto set my hand.

CHARLES F. HINDLE.